(12) United States Patent
Chng et al.

(10) Patent No.: US 7,783,830 B2
(45) Date of Patent: Aug. 24, 2010

(54) SOLID STATE DEVICE PATTERN FOR NON-SOLID STATE STORAGE MEDIA

(75) Inventors: YongPeng Chng, Singapore (SG); ChweeFern Ee, Singapore (SG); CheeSeng Toh, Singapore (SG); KwanYin Chow, Singapore (SG); HuaYuan Chen, Singapore (SG); Wesley Chan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 586 days.

(21) Appl. No.: 11/605,749

(22) Filed: Nov. 29, 2006

(65) Prior Publication Data

US 2008/0123211 A1    May 29, 2008

(51) Int. Cl.
*G06F 12/00*  (2006.01)
*G06F 1/00*  (2006.01)

(52) U.S. Cl. ............ 711/113; 711/112; 711/163; 711/164; 713/300; 713/320; 713/340

(58) Field of Classification Search .......... 711/113, 711/118, 112, 163, 164; 713/300, 340, 320; 714/22, 24, 47
See application file for complete search history.

(56) References Cited

U.S. PATENT DOCUMENTS

| 4,425,615 A * | 1/1984 | Swenson et al. ............ 711/114 |
| 4,433,374 A * | 2/1984 | Hanson et al. ............. 711/138 |
| 5,799,307 A * | 8/1998 | Buitron ..................... 707/100 |
| 6,134,071 A * | 10/2000 | Andoh et al. ................ 360/75 |
| 6,567,899 B2 * | 5/2003 | Ghosh et al. ............... 711/156 |
| 7,627,713 B2 * | 12/2009 | Trika et al. ................. 711/113 |
| 2001/0032298 A1 * | 10/2001 | Emons ..................... 711/138 |
| 2004/0103345 A1 * | 5/2004 | Dunstan ..................... 714/24 |
| 2005/0120251 A1 * | 6/2005 | Fukumori ................... 713/300 |
| 2005/0240814 A1 * | 10/2005 | Sasakura et al. ............. 714/14 |
| 2006/0020855 A1 * | 1/2006 | Okada et al. ................. 714/14 |
| 2008/0005474 A1 * | 1/2008 | Long ........................ 711/118 |

\* cited by examiner

*Primary Examiner*—Kevin L Ellis
*Assistant Examiner*—Mehdi Namazi
(74) *Attorney, Agent, or Firm*—David K. Lucente (57) ABSTRACT

A method and apparatus for receiving data at a non-solid state storage device, which includes a store cache and a storage medium. The received data is written to the store cache and transferred from the store cache to the storage medium. In response to receiving a signal at the storage device that is indicative of a power off condition of a data source device from which the data was received, at least a portion of the data remaining in the store cache is transferred to the storage medium prior to powering off the storage device.

15 Claims, 5 Drawing Sheets

```
                              EVENT            410
                              NUMBER           /
                                          COMMAND     420
                                          DECODED      /
                                                      HASH    430
                                                      BLOCKS   /
                                                              SECTOR   440
                                                              COUNT     /
                                                                       DATA     450
                                                                       OF        /
                                                                       DATA
                                                                       WORDS
                                                                       1
        =============================================================================
        303,053         31      0x00771E        01              0000
460 →   330,069         31      0x007720        01              0000
        330,085         31      0x007721        01              0000
        330,101         31      0x007722        01              0000
        330,117         31      0x007723        01              0000
        330,133         31      0x007724        01              0000
        330,149         31      0x007725        01              0000
        330,165         31      0x007726        01              0000
        330,181         31      0x007727        01              0000
470 →   330,184 Power Off/On
        330,300         21      0x000000        01              EB58
        330,315         21      0x000001        01              5252
        330,330         21      0x000024        DC              F8FF
        331,002         21      0x000100        23              0000 series of READ commands 376,857         21      0x003AE9        17              0000
        376,938         21      0x003B00        A2              0000
480 →   377,436         21      0x007720        01              4443
        377,451         21      0x007728        01              2E20
        377,466         21      0x007720        01              4443
        377,481         21      0x007728        01              2E20
        377,496         21      0x007730        01              2E20
```

SOLID STATE DEVICE PATTERN FOR NON-SOLID STATE STORAGE MEDIA

FIELD OF THE DISCLOSURE

The present disclosure relates generally to data storage devices, and more particularly but not by limitation to write cache management of non-solid state storage devices that allows the devices to mimic solid state storage devices or operate as a non-solid state storage devices.

BACKGROUND OF THE DISCLOSURE

Computer and other electronic devices generally require a medium in which digital data can be stored and retrieved. Data storage devices come in a variety of forms and serve a variety of purposes. These devices can be broken down into two general categories: solid state and non-solid state storage devices.

Non-solid state devices are devices that contain moving parts. Some typical non-solid state storage devices are hard disc drives, CD/RW drives and discs, DVD/R/RW drives and discs, floppy discs, tape drives and probe memory devices. These storage devices move one or more media surfaces and/or the associated data head relative to one another to position the data head relative to a desired location or area on the media. The data is then written to or read from this data location. In disc drives for example, data is stored on a disc that rotates at an essentially constant velocity. By moving the head over the rotating disc, all memory locations or sectors of the disc can be accessed.

Solid state memory devices differ from non-solid state devices in that they typically have no moving parts. One example of solid state memory is flash memory, such as used in a Compact Flash Memory Card. Flash memory is used primarily for easy and fast information storage in such devices as digital cameras, home video game consoles and personal digital assistants.

Flash memory has typically been the storage media of choice for consumers using small electronic devices that require memory storage. Removable solid state storage devices are becoming increasingly popular. Smart Media and Compact Flash are both well known, especially as "electronic film" for digital cameras or as memory cards in personal digital assistants. The advantage of flash memory in these devices is that they are noiseless, have generally faster access than a typical hard drive, and they are generally smaller and lighter. Further, the power consumption of a flash memory device is typically lower than that of a hard disc drive. However, flash memory is relatively expensive when compared to hard disc drives for an equivalent memory size. Further, a hard disc drives typically have much greater storage capacities than a flash memory device or other solid state memory devices.

Manufacturers of non-solid state memory devices are attempting to create solutions for these small electronic devices requiring data storage. Numerous attempts have been made to provide the users with the benefits of both a flash memory and a hard disc in a single non-solid state storage device. One attempt has been to remove the write caching feature found in a hard disc drive and write data directly from the drive to the disc. However, this approach has been quite problematic in that it has caused an increase in power consumption and a reduction in the efficiency of the drive.

Embodiments of the present disclosure provide solutions to these and other problems, and offer other advantages over the prior art.

SUMMARY OF THE DISCLOSURE

One embodiment of the present disclosure is directed to a method, which includes: (a) receiving data at a non-solid state storage device, which comprises a store cache and a storage medium; (b) writing the data to the store cache and transferring at least some of the data from the store cache to the storage medium; (c) receiving a signal at the storage device, which is indicative of a power off condition of a data source device from which data was received; and (d) transferring, in response to the received signal, at least a portion of any of the data remaining in the store cache to the storage medium prior to powering off the storage device.

Another embodiment of the present disclosure is directed to a storage device. The storage device includes a non-solid state storage media, an interface configured to receive data from a data source, and a store cache configured to store the data until it is written to the storage media. The storage device further includes a device manager, which monitors the interface for an event indicative of a power off condition, and responsively transfers at least some of any of the data remaining in the store cache to the storage media.

Other features and benefits that characterize embodiments of the present disclosure will be apparent upon reading the following detailed description and review of the associated drawings.

DETAILED DESCRIPTION OF ILLUSTRATIVE EMBODIMENTS

Figure 1:
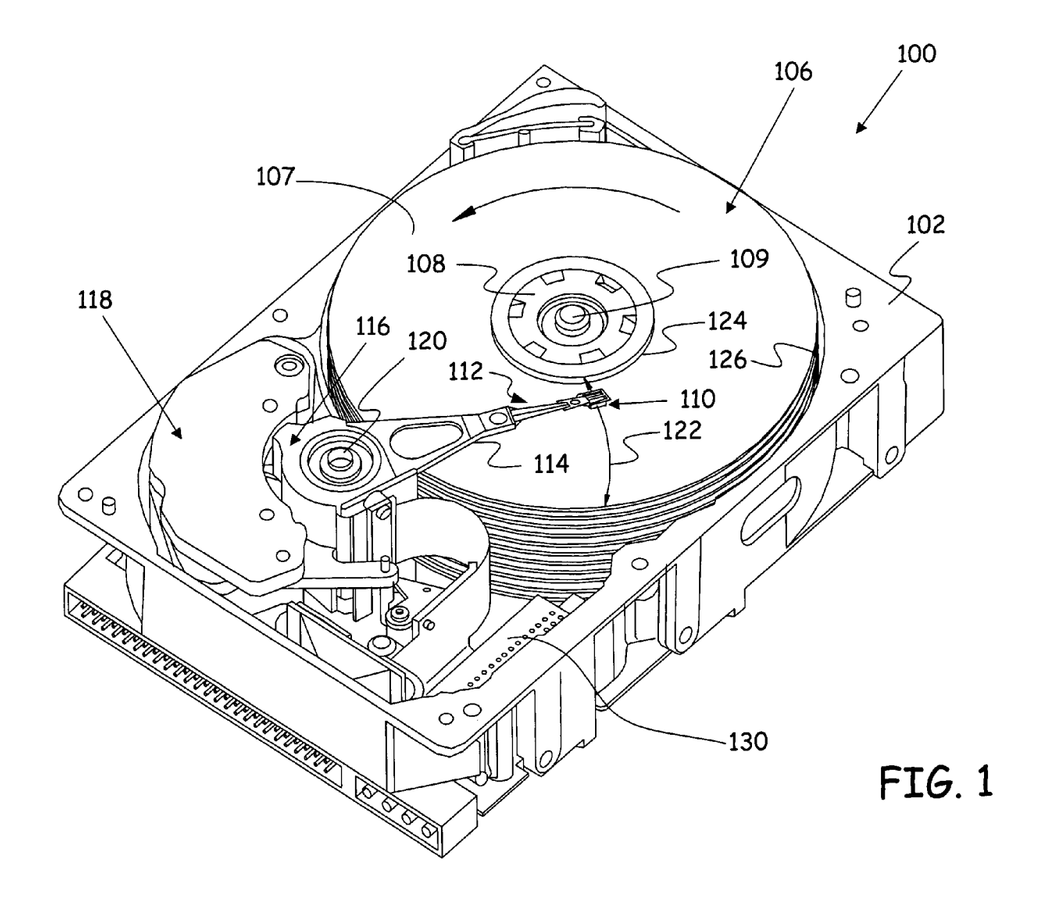
FIG. 1 is an isometric view of a disc drive.

FIG. 1 is an isometric view of a disc drive 100 in which embodiments of the present disclosure are useful. However, other types of non solid state data storage devices can be used. These devices can include, for example, CD/RW drives and discs, DVD/R/RW drives and discs, floppy discs, tape drives, probe memory devices, and any other non-solid state storage device.

Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
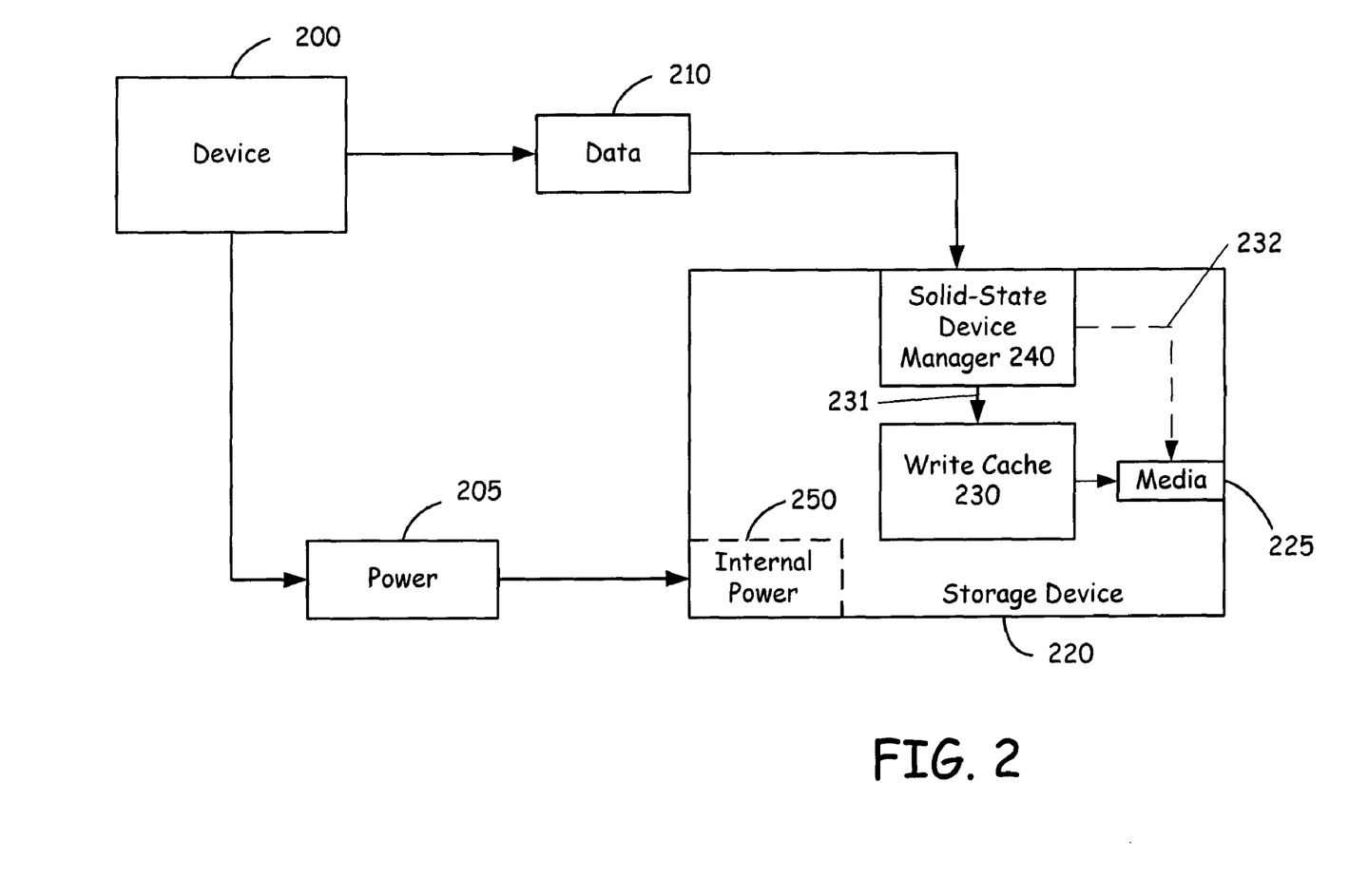
FIG. 2 is a block diagram of components of a non-solid state storage device.

FIG. 2 is a block diagram illustrating the components of a device 200 using a non-solid state storage device 220 according to one illustrative embodiment of the present disclosure. The device 200 can be any device that is capable of using either a solid state or a non-solid state storage device to store and retrieve data. In the present example, the device 200 is a digital camera. However, those skilled in the art will readily recognize that numerous other devices can be used instead. For example, device 200 could be a personal digital assistant, a cell phone, a video game console, or any other device requiring data storage.

Device 200 provides data 210 such as picture data to the storage device 220. However, other types of data can be provided. In one embodiment, storage device 220 is a disc drive, such as the disc drive discussed above in FIG. 1. However, those skilled in the art will readily recognize that other non-solid state storage devices can be used. Storage device 220 includes storage media 225, a write cache or buffer 230, and a solid state device manager 240. The write cache 230 can use any known method or system for managing data that is to be written to the storage media 225. The solid state device manager 240 allows the storage device 220 to act as if it is a solid state storage device. The details of how the solid state device manager 240 operates according to one embodiment are discussed in more detail with regard to FIG. 5.

Device 200 provides power 205 to the storage device 220. This power 205 allows the storage device 220 to retrieve data from and write data to the storage media 225. This power also allows for the data in the write cache 230 to be maintained. When the power from device 200 is removed from the storage device 220, such as when the user turns off the power supply to the device by hitting an on/off button, data in the write cache 230 is lost. In some embodiments, an optional internal power supply 250 is present in the storage device 220. This power supply 250 includes, in one embodiment, a capacitor. However, other sources of temporary power can be used in this storage device 220, such as a rechargeable battery. This optional power supply 250 is provided such that any data remaining in the write cache can be written to the storage device 220 prior to the depletion of the available power. Alternatively, the write cache can be sized such that the data can be written to the storage media 225 prior to the depletion of any remaining power.

Figure 3A:
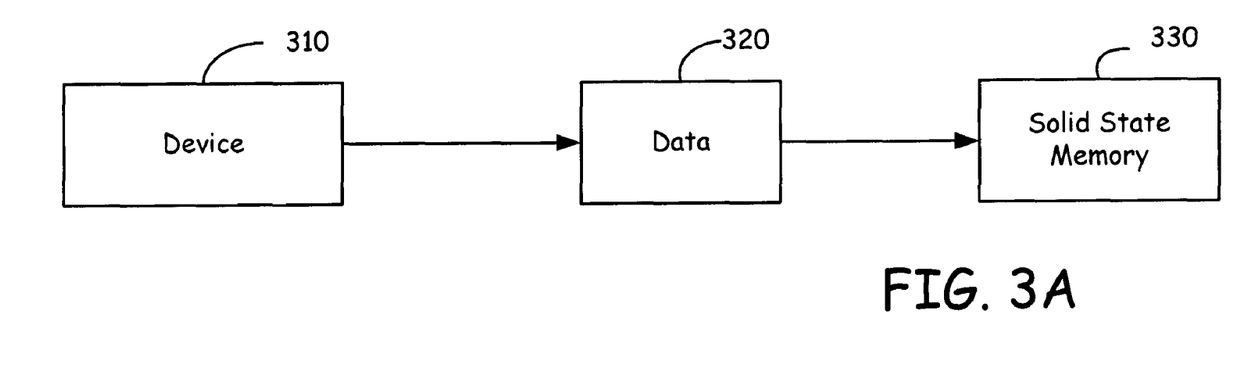
FIG. 3A is a block diagram of a writing process in a solid state device.
Figure 3B:
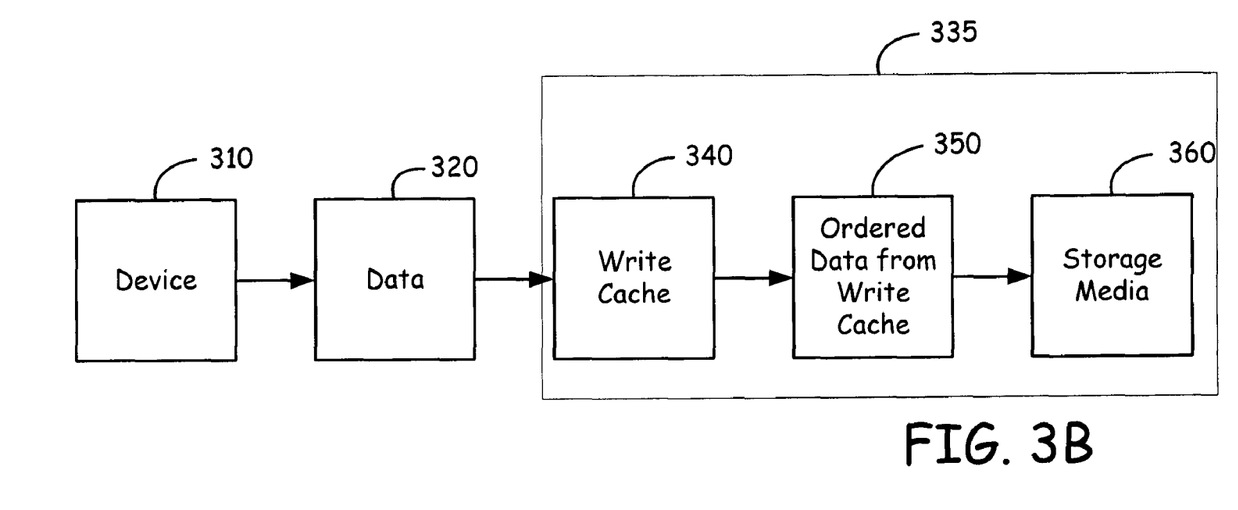
FIG. 3B is a block diagram of a writing process in a non-solid state device.

FIGS. 3A and 3B contrast the data flows to solid state and non-solid state memory devices. FIG. 3A is a block diagram, which illustrates a data flow process when a device 310 is equipped with a solid state memory 330. Device 310 transfers data 320 directly to solid state memory 330.

FIG. 3B is a block diagram, which illustrates a data flow process when device 310 is equipped with a non-solid state storage device 335. Device 335 includes a write cache 340 and a non solid state storage media 360. In FIG. 3B, the data 320 is transferred from the device 310 to write cache 340 (which is similar to write cache 230 discussed above). Write cache 340 orders the data for efficient storage and transfers ordered data 350 from write cache 340 to storage media 360. However, as described above with reference to FIG. 2, if the power to device 310 is cut off, the power to the storage device 335 is also cut off. When the power is cut off from the storage device 335, the device is no longer able to write data from the write cache 340 to the media 360. Also at this time any data in the write cache 340 is lost since a typical write cache requires continuous power to maintain the data. The loss of this unstored data is more noticeable in devices that use instant on or off, such as digital cameras. Therefore, to minimize the loss of data and to enable a hard disc drive or other non-solid state storage device 335 to behave like a solid state storage device, the write cache 340 could be disabled such that the data 320 is written onto the media before the device 335 indicates that it is ready to write the next data.

However, the process of writing data directly to the disc media on a hard disc for every command or data that is received slows the performance and increases the power consumption. This is due to the increased number of disc revolutions needed to write the required data. Whereas with the write cache 340 enabled, the data is collected and re-ordered in order to write the data to the disc within a smaller number of disc revolutions.

An embodiment of the present disclosure avoids one or more of these difficulties by enabling the write cache 230 during normal operation and then transferring data remaining the write cache 230 to the disc, or other storage media, whenever an event is detected that typically precedes a power-off condition. Any suitable event can be used, and the particular event will depend on the particular device. The event can be detected by monitoring the bus activity between the data source device and the data storage device or an internal activity of the source device.

Figure 4:
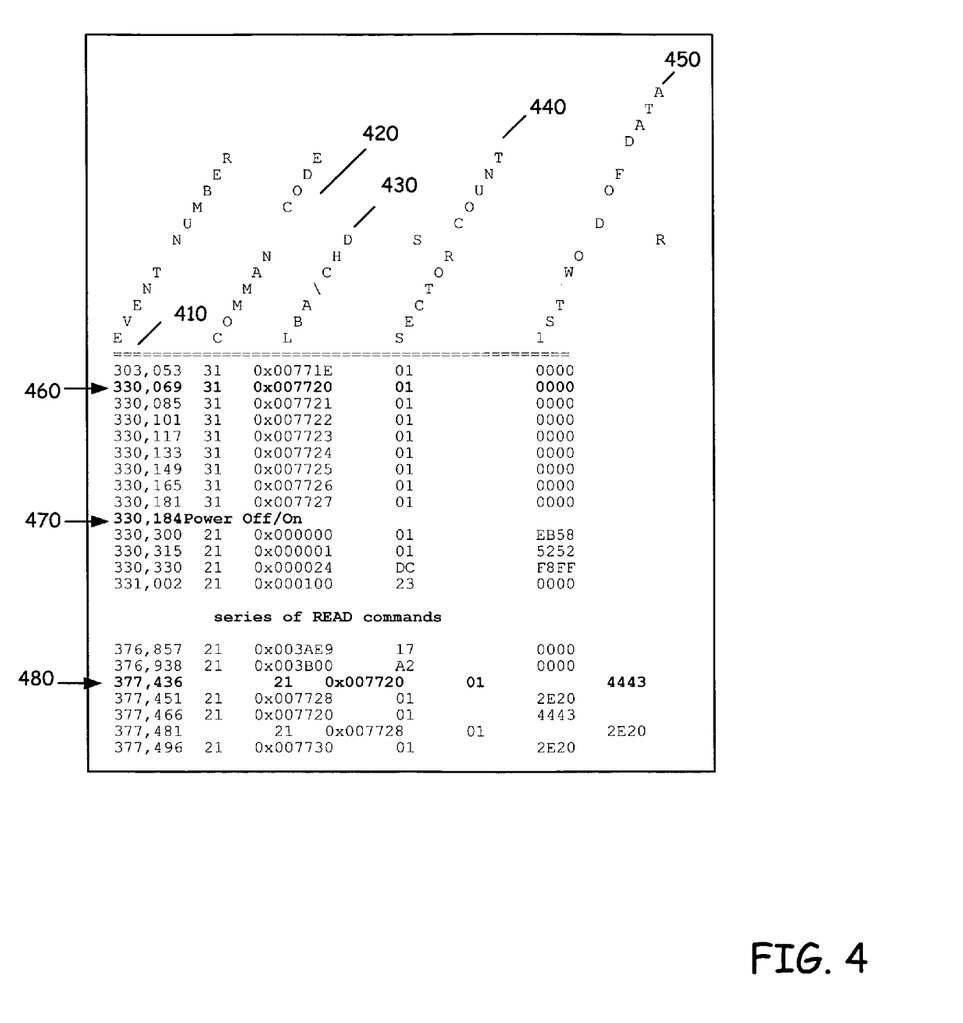
FIG. 4 is a BUS code capture during a power off event.

FIG. 4 is an example of a code capture of bus activity from device 200 to storage device 220 (shown in FIG. 2). In this example, media 225 (also in FIG. 2) is a data storage disc. The data in FIG. 4 is provided in a table format and illustrates loss of data due to a power cycle event when the write cache 230 is enabled. The first column 410 represents the event number. The second column 420 represents the associated command code for the event. In this illustration the command code "31" represents a write command, and the command code "21" represents a read command. The third column 430 represents a logical block address of the disc being accessed. Each logical block address represents a location on the drive where the data is located. The fourth column 440 represents the sector count. The fifth column 450 represents the first word of the data either being written to the disc or retrieved from the disc. This data is represented in a hexadecimal format.

In the code capture at line 460, event number 330,069 indicates that device 200 issued a write command to logical block address 0X007720 with a sector count of 01 and a first word of data 0000. It should be noted again that only the first data word is illustrated in this figure. However, those skilled in the art will readily recognize the additional data is actually present, but for purposes of simplicity has been omitted. The write command at line 460 is written into the write cache 340 for transfer to the storage media 360 at the most appropriate time. However, at line 470 represented by event number 330,184 a power off/on cycle event occurred. This event could be caused, for example, by the user turning off the power to the camera, a battery failure or another event. After the power off/on cycle event 330,184, the device 200 performed a series of read commands. No write commands were performed at all. During this series of read commands the logical block address associated with line 460 was retrieved at line 480 as indicated by event 377,436. However, instead of the first word of the data being 0000 the read command returned a value of 4443. This error was caused because the data associated with the write command at the event indicated at line 460 had not yet been written onto the disc media prior to the power off/on cycle.

This loss of data can be avoided by writing the data to the disc media after detecting an event that typically precedes or is predictive of a power on/off cycle or event. In one embodiment, the events that typically occur prior to a power cycle are identified by analyzing the file system of the device. In other embodiments the device is analyzed to determine the characteristic features of the device that occur prior to powering off. These characteristics can include a command to write to a specific location on the storage media, a series of codes produced, or any other detectable event. In the various embodiments, it is only necessary for the device to learn what indicators the device produces prior to powering off. These indicators can be commonly referred to as signals indicative of a power off condition. The analysis of one exemplary file system is illustrated below in Table 1. It should be noted that each individual device may have its own series of events that can occur prior to shut down. Therefore, it may be necessary to analyze a number of devices to determine each device's own unique set of parameters.

TABLE 1

| Byte Offset (in hex) | Field Length | Value | Meaning |
|---|---|---|---|
| 0x00 | 3 bytes | 0xEB 58 90 | Jump instruction |
| 0x03 | 8 bytes | 0x4D 53 44 4F 53 35 2E 30 | OEM Name in text (MSDOS 5.0) |
| 0x0B | Word | 0x0200 = 512 (dec) | Bytes per Sector |
| 0x0D | Byte | 0x08 | Sector per Cluster |
| 0x0E | Word | 0x24 = 36 (dec) | Reserved Sectors |
| 0x10 | Byte | 0x02 | Number of Allocation Tables (FATS) Max. No. of copies in the volume |
| 0x11 | Word | 0x0000 | Root Entries |
| 0x13 | Word | 0x0000 | No. of sectors in partition smaller than 32 MB |
| 0x15 | Byte | 0xF8 | Media Type F8 = Hard disc |
| 0x16 | Word | 0x0000 | Sectors per FAT not use by FAT32 |
| 0x18 | Word | 0x003F = 63 | Sectors per Track |
| 0x1A | Word | 0x00FF = 255 | Numbers of Heads |
| 0x1C | DWord | 0x00000000 | Number of Hidden Sectors in Partition |
| 0x20 | DWord | 0x00EE6B30 | Number of Sectors in Partition |
| 0x24 | Dword | 0x00003B7E | Number of Sectors Per FAT |
| 0x28 | Word | 0x0000 | Flags |
| 0x2A | Word | 0x00 | Version of FAT32 Drive |
| 0x2C | Dword | 0x0002 | 0x0002 Cluster Number of the Start of the Root Directory |
| 0x30 | Word | 0x0001 | Sector Number of the File System Information Sector |
| 0x32 | Word | 0x0006 | Sector Number of the Backup Boot Sector |
| 0x34 | 12 Bytes | 0x0000 0000 0000 0000 0000 0000 | Reserved |
| 0x40 | Byte | 0x00 | Logical Drive Number of Partition |
| 0x41 | Byte | 0x00 | Unused |
| 0x42 | Byte | 0x29 | Extended Signature |
| 0x43 | Dword | 0x0038A08A | Serial Number of Partition |
| 0x47 | 11 Bytes | 0x4E4F 204E 414D 4520 2020 20 | Volume Name of Partition |
| 0x52 | 8 Bytes | 0x4641 5433 3220 2020 | FAT Name (FAT32) |
| 0x5A | 420 Bytes |  | Executable Code |
| 0x1FE | 2 Bytes | 0x55AA | Boot Record Signature |

In one embodiment the File Allocation Table (FAT) for the storage device as it interfaces with the device is analyzed. In the embodiment illustrated above where the data was not written, the error occurred during the power off cycle. In one particular storage media using FAT32, a number of important features of the FAT were identified and illustrated below:

FAT32 Boot Record's offset 0Dh, "Sectors Per Cluster"=08

FAT32 Boot Record's offset 0Eh, "Reserved Sector"=24

FAT32 Boot Record's offset 24h, "Sectors per FAT"=00 00 3B 7E

Knowing the specific numbers shown above, the locations of each FAT, (FAT1, FAT2, etc) can be tabulated. Based on the above, several features of the writing process can be identified by the following calculations:

$$\text{Start of } FAT1 = \text{Boot record Structure location} + \text{Reserved Sector}$$
$$= 0 + 24$$
$$= \text{Logical Block Address } (LBA)24$$

$$\text{Start of } FAT2 = FAT1 + \text{Sectors Per } FAT$$
$$= 24 + 3B7E$$
$$= LBA \ 3BA2$$

-continued $$\text{Start of Root Directory} = FAT2 + \text{Sectors Per } FAT$$
$$= 3BA2 + 3B7E$$
$$= LBA \ 7720$$

$$\text{Start of Sub Directory} = \text{Root Directory} + \text{Sector Per Cluster}$$
$$= 7720 + 8$$
$$= LBA \ 7728$$

$$\text{Start of Sub Directory File Info} = \text{Start of Sub Directory} +$$
$$\text{Sector Per Cluster}$$
$$= 7728 + 8$$
$$= LBA\ 7730$$

Based on the above analysis, it was observed that the power off cycle occurred after the root directory was updated, but before the completion of the entire write command event.

Referring back to the embodiment shown in FIG. 2, the solid state device manager 240 can therefore be configured to monitor the data structure of the data storage device 220 to ensure that the write command can be completed and ensure that data in the write cache 230 can be transferred prior to the loss of power to the data storage device. This process is discussed in greater detail below.

Figure 5:
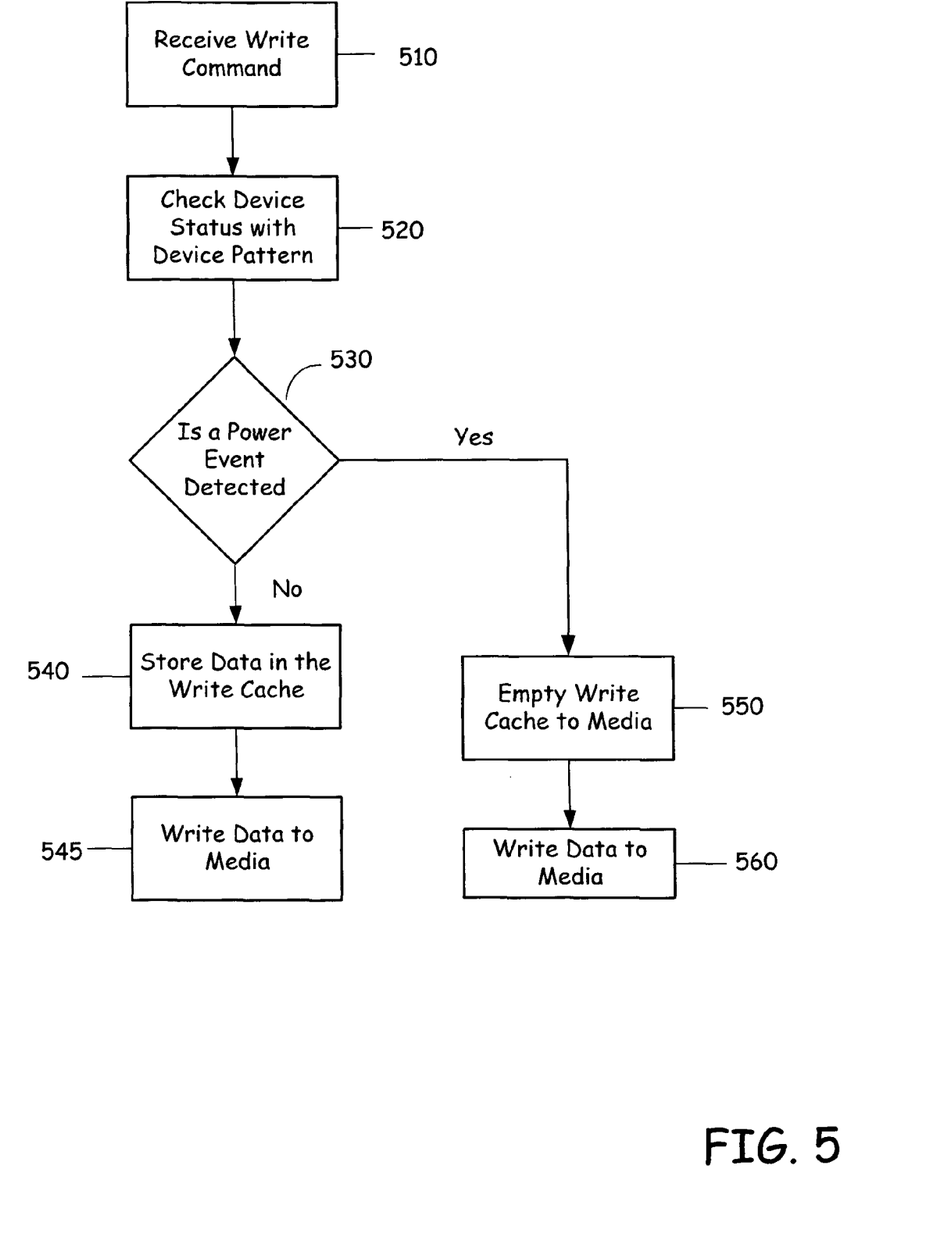
FIG. 5 is a flow diagram of a process for storing data according to one embodiment.

FIG. 5 is a flow diagram illustrating the process executed by device 200 having a solid state device manager 240 according to one embodiment. At step 510 the data is received at the storage device 220 with a write command. This data is representative of the information to be stored on the storage device 220. In response to this write command, the solid state device manager 240 accesses information related to the current status of the device 200 providing the data, at step 520. This information is learned through testing or other methods so that the device manager 240 can be configured, as discussed above, to detect the signals, codes or other information that are produced by device 200 and predictive of when the device will be powered off. Next, this information is analyzed by the solid state device manager 240. At step 530, during this analysis the solid state device manager 240 looks at the data stream or other indicators of activity on the device 200 to determine if there is a power off event that is about to occur or other event type that can cause a data loss. This is illustrated at step 530.

Based on the information analyzed at step 520 and the determination of a power off event at step 530 the solid state device manager 240 either allows the data to be written to the write cache 230 as indicated by arrow 231 in FIG. 2 or bypasses the write cache 230 by writing the data directly to the storage media 225 as shown by arrow 232 in FIG. 2. This decision is based on the analyzing process of step 530. If the solid state device manager 240 determines that there is no power off situation occurring then the data is written to the write cache 230, at step 540. When data is written to the write cache the data is eventually written to the storage media 225 according to the programming and method associated with the storage device's write cache, at step 545.

If, however, the solid state device manager 240 determines that a power off event has occurred on the device 200, a number of actions are initiated by the solid state device manager 240. The solid state device manager 240 also generates instructions or otherwise commands the write cache to immediately write all of the data that is presently stored in the write cache 230 to the storage media 225, at step 550. This data in the write cache 230 is written to the storage media 225 without regard to the preferred order of writing the data to the storage media 225. The solid state device manager 240 instructs or otherwise causes the newly received data to be written directly to the storage media. This is illustrated at step 560. While in this example the instructions to dump the write cache are performed first and instructions to write the new data directly to the disc are performed second, those skilled in the art will readily recognize that these two steps can be reversed.

It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the storage media while maintaining substantially the same functionality without departing from the scope and spirit of the present disclosure. In addition, although the embodiment described herein is directed to a data storage media for digital cameras, it will be appreciated by those skilled in the art that the teachings of the present disclosure can be applied to other devices without using both solid state and non-solid state storage devices, without departing from the scope and spirit of the present disclosure.

What is claimed is:

1. A method, comprising:
  (a) monitoring data storage access commands between a source device and a storage device to detect a specific address of a storage medium of the storage device that can precede or is predictive of a power off condition of the source device; and
  (b) transferring, in response to the detected address, at least a portion of any of data in a store cache of the storage device to the storage medium.

2. The method of claim 1 and further comprising:
  (c) disabling the store cache in response to the detected specific address in step (a); and
  (d) writing any data received from the source device after disabling the store cache in step (c) directly to the storage medium.

3. The method of claim 1 and further comprising:
  (c) providing supplemental power to the storage device from a supplemental power source after detecting the specific address, wherein the supplemental power source is a component of the storage device.

4. The method of claim 1 and further comprising:
  sizing the store cache such that residual power in the storage device, following detection the specific address indicative of the power off condition, is sufficient to write the entire store cache to the storage medium.

5. The method of claim 1, wherein the specific address corresponds to an address of a file system of the source device that is typically written prior to a power off condition of the source device.

6. The method of claim 5, wherein the specific address corresponds to a root directory of the file system.

7. The method of claim 1, wherein the storage device comprises a non-solid state storage device.

8. A device, comprising:
  storage media;
  an interface;
  a store cache configured to store data received on the interface; and
  a device manager, which monitors the interface for data storage access commands received from a source device to detect a specific address of the storage media that can precede or is predictive of a power off condition, and responsively transfers at least some of any of the data in the store cache to the storage media.

9. The device of claim 8 wherein the device is powered by the source device.

10. The device of claim 8 wherein the device manager is configured to cause data received at the interface after detection of the specific address to bypass the store cache and be written directly to the storage media.

11. The device of claim 8 further comprising a bypass data path coupled between the interface and the storage media, wherein the device manager enables the bypass data path and disables the store cache in response to detection of the specific address.

12. The device of claim 8 wherein the store cache is sized such that residual power in the device following detection of the specific address is sufficient to transfer all of data remaining in the store cache to the media.

13. The device of claim 12 further comprising:
a power source configured to provide sufficient power to the storage media to empty the store cache following detection of the specific address.

14. The device of claim 8 wherein the storage media comprises non-solid state storage media.

15. A device, comprising:
a storage medium;
an interface;
a store cache configured to store data received on the interface;
a device manager, which monitors the interface for a write command to a particular address that precedes or is predictive of a power off condition of the source device and, upon detection of the write command, responsively transfers at least some of the data remaining in the store cache to the storage medium.

* * * * *